UNITED STATES PATENT OFFICE.

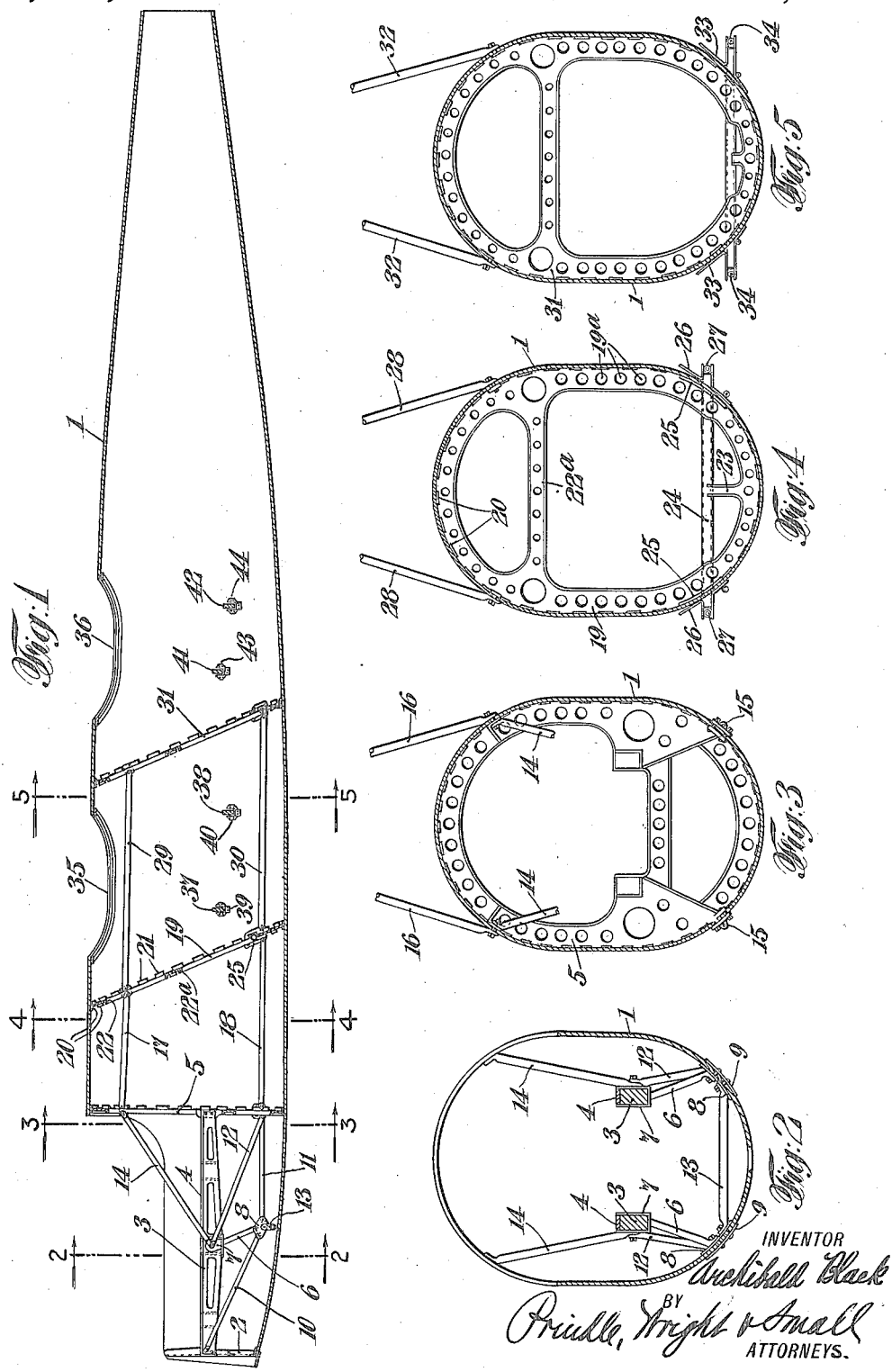

ARCHIBALD BLACK, OF BROOKLYN, NEW YORK, ASSIGNOR, BY MESNE ASSIGNMENTS, TO L-W-F ENGINEERING COMPANY, INC., OF COLLEGE POINT, LONG ISLAND, NEW YORK, A CORPORATION OF NEW YORK.

FUSELAGE.

1,393,488.  Specification of Letters Patent.  Patented Oct. 11, 1921.

Application filed March 21, 1917. Serial No. 156,339.

*To all whom it may concern:*

Be it known that I, ARCHIBALD BLACK, a citizen of the United States, of Brooklyn, in the county of Kings, and in the State of New York, have invented a certain new and useful Improvement in Fuselage, and do hereby declare that the following is a full, clear, and exact description thereof.

My invention relates particularly to the construction of fuselages for aeroplanes, and especially a system of bracing used in connection with the same.

The object of my invention is to provide a fuselage and bracing means for the same, in which the fuselage is strengthened so as to prevent any possibility of collapse transversely of the length thereof. The object of my invention is particularly to provide a construction of this character in which the fuselages, when made in the form of a hollow shell, will be strengthened against collapse in a transverse direction, especially when alighting and when submitted to unusual stresses. A further object is to provide strengthening means for fuselages which may at the same time be used as a base for attachment of the wing-staying and supporting devices. Further objects of my invention will appear from the detailed description thereof contained hereinafter.

While my invention is capable of embodiment in many different forms, for the purpose of illustration I have shown only one form thereof in the accompanying drawings, in which—

Figure 1 is a longitudinal section of a fuselage made in accordance with my invention.

Fig. 2 is a transverse section of the same taken on line 2—2 in Fig. 1.

Fig. 3 is a transverse section of the same taken on line 3—3 of the same figure.

Fig. 4 is a similar section taken on line 4—4 of the same figure, and

Fig. 5 is a similar section taken on line 5—5 of the same figure.

In the drawings I have shown a fuselage 1 which may be made in any suitable manner, but which is preferably constructed of a plurality of layers of thin wooden strips, preferably running spirally around the fuselage but in opposite directions in the different layers, alternating with layers of cloth as, for example, tape wound spirally around the same, all of the layers being united together with glue. At the front of the fuselage 1 there is shown a U-shaped plate 2, to the sides of which there are shown attached a pair of beams 3 having metal plates 4 on the upper surface thereof to support an engine of any suitable type. The rear ends of the wooden beams 3 are shown attached to an annular bracing plate 5. Intermediate of the ends of the beams 3, the latter are shown supported by bracing rods 6 which are shown secured to said beams 3 at their upper ends by means of yokes 7, and which are shown as inclined rearwardly and connected at their lower ends to plates 8 attached to the fuselage 1, and connected also to exterior plates 9 on the outside of the fuselage 1. Said plates 8 are furthermore shown as provided with forwardly directed bracing rods 10 which are shown connected at their forward ends to the U-shaped plate 2. Rearwardly-directed bracing rods 11 may extend from plates 8 to the annular bracing plate 5, and inclined bracing rods 12 may extend from the point of union of the bracing rods 11 and the annular bracing plate 5 to the point of union of the rod 6 with the beams 3. A transverse brace 13 preferably extends between the two plates 8 from the point of union of the rods 6 and 12 with the beams 3. Further braces 14 may extend to the upper portion of the annular plate 5. The annular plate 5 preferably has furthermore secured thereto on the exterior of the fuselage 1, eye-plates 15 for connection with wires used for bracing the supporting planes of the aeroplane, said plates 15 being shown located at the rear ends of the rods 11 and 12. Furthermore, at the rear ends of the rods 14 and on the exterior of the fuselage 1 there are preferably provided struts 16, which may extend upwardly to the upper supporting plane. From the points of union of the rods 12 and 14 with the annular plate 5, upper and lower bracing rods 17 and 18 may extend rearwardly in a substantially horizontal position, and are shown connected at their rear ends to an annular inclined bracing plate 19. The annular plate 19 is inclined so that its upper portion is in advance of the lower portion and is preferably constructed substantially in the form of a channel bar having a plurality of small openings $19^a$ around its periphery, with alternating forward and rearward tongues 20 and 21 secured to the interior of the fuselage 1 in any suitable manner, and an inner strengthening flange 22, as well as an upper transverse strengthening beam 22ª. At its lower portion the bracing plate 19 has, in the embodiment shown, an upwardly directed tongue 23, which is preferably welded to a transverse strengthening member in the form of a tube 24 to take care of transverse tension in flight, which members, as shown, extends across the face of the plate 19 and is attached at its outer ends to plates 25, which are welded to the plate 19. However, if desired, the tube 24 may be made removable so that it may be removed if desired for convenience in assembling or other such reason. The plates 25 may form the means for connecting the bracing plates 19 to the rods 18. Upon the exterior of the fuselage 1 brackets 26 are provided to be secured to the plates 25, said brackets 26 preferably having eyelets 27 for connection with the wires which may extend to the supporting planes of the aeroplanes. Extending upwardly from the upper portion of the bracing plates 19 at the point where the same is connected to the upper bracing rods 17, there may extend upwardly a pair of struts 28. Extending rearwardly from the bracing plates 19 there are shown upper and lower bracing rods 29 and 30 which are preferably connected at their rear ends to a forwardly inclined bracing plate 31, which is preferably constructed substantially the same as the bracing plate 19 except for differences in proportions, the differences in proportions being evident from a comparison of Figs. 4 and 5. From the upper portion of the plate 31, at the point where the upper bracing rods 29 join said plate, there may extend upwardly a pair of struts 32. Futhermore in connection with the bracing plate 31 I may provide on the exterior of the fuselage 1 brackets 33, which are preferably connected to the bracing plate 31 in a manner similar to the attachment of the brackets 26 to the bracing plate 19, and the brackets 33 are preferably provided with eyelets 34 for attachment to the inner ends of the staying wires of the supporting planes. Immediately to the rear of the bracing plate 19 I may provide on the top of the fuselage an opening 35 for the engine operator of the aeroplane, and in the rear of the bracing plate 31 I may provide a similar opening 36 for the aeroplane pilot. Beneath the opening 35 I have shown a pair of cross bars 37 and 38 supported in brackets 39 and 40, and beneath the opening 36 I have shown a pair of similar cross bars 41 and 42 supported in brackets 43 and 44, all of said cross bars being optionally provided for holding seats to be occupied by the aeroplane operators.

The fuselage built in accordance with my invention is adequately strengthened crosswise by the bracing plates such as 5, 19 and 31, and particularly bracing plates 19 and 31, so as to avoid any possibility of collapsing transversely when the aeroplane is subjected to any undue stresses intermediate of the ends of the fuselage. At the same time the fuselage is greatly strengthened throughout by the presence of these bracing plates especially by reason of the fact that the bracing plates are connected together by the longitudinal bracing beams 17, 18, 29 and 30. Furthermore the presence of the bracing plates 5, 19 and 31 provides means for supporting the upwardly extending struts and for anchoring the inner ends of the staying wires leading to the supporting planes of the aeroplanes. The bracing plates 19 and 31 are so located as to give a maximum amount of transverse strengthening to the fuselage, especially as near as possible to the exact points where the operators are located, while at the same time they are so positioned as to provide as great an amount of room as possible immediately in front of the aeroplane operators. The construction is such as to permit a considerable degree of freedom of movement of the aeroplane operators, especially owing to the presence of the openings in the bracing plates 19 and 31 above and below the transverse bars passing across the same.

It will be noted that the plates shown are in contact with the fuselage shell throughout their peripheries, thus bracing the shell more thoroughly than would be done were certain parts of peripheries of said plates not in contact with said shell.

While I have described my invention above in detail, I wish it to be understood that many changes may be made therein without departing from the spirit of my invention.

I claim:

1. A fuselage having a transverse strengthening means adjacent to the position of the aeroplane operator, said means being inclined forwardly at its upper portion, said means being provided with an opening to permit the operator to move therein, and another opening above the first mentioned opening with a cross bar located between the same.

2. An annular bracing means having alternating forwardly and rearwardly directed tongues at its outer edge.

3. An annular bracing means having forwardly and rearwardly directed tongues at its outer edge, said bracing means being provided with a transverse strengthening bar.

4. An annular bracing means having alternating forwardly and rearwardly directed tongues at its outer edge, said bracing means being provided with a transverse strengthening bar.

5. An annular bracing means having forwardly and rearwardly directed tongues at its outer edge, said bracing means being provided with a transverse strengthening bar at the upper portion thereof.

6. An annular bracing means having alternating forwardly and rearwardly directed tongues at its outer edge, said bracing means being provided with a transverse strengthening bar at the upper portion thereof.

7. An annular bracing means having forwardly and rearwardly directed tongues at its outer edge, said bracing means being provided with a transverse strengthening bar at the lower portion thereof.

8. An annular bracing means having alternating forwardly and rearwardly directed tongues at its outer edge, said bracing means being provided with a transverse strengthening bar at the lower portion thereof.

9. An annular bracing means having forwardly and rearwardly directed tongues at its outer edge, said bracing means being provided with a transverse strengthening bar at the lower portion thereof, and a tongue supporting the middle of the transverse bar.

10. An annular bracing means having alternating forwardly and rearwardly directed tongues at its outer edge, said bracing means being provided with a transverse strengthening bar at the lower portion thereof, and a tongue supporting the middle of the transverse bar.

11. An annular bracing means having forwardly and rearwardly directed tongues at its outer edge, said bracing means being provided with a transverse strengthening bar at the lower portion thereof, and a tongue supporting the middle of the transverse tubular bar.

12. An annular bracing means having alternating forwardly and rearwardly directed tongues at its outer edge, said bracing means being provided with a transverse strengthening bar at the lower portion thereof, and a tongue supporting the middle of the transverse tubular bar.

13. A fuselage provided with an operator's opening, a forwardly inclined transverse strengthening plate disposed adjacent said opening, said plate having an opening to permit the operator to move therein.

14. A fuselage provided with an operator's opening, inclined strengthening plates lining the interior of the fuselage and disposed forwardly of and to the rear of said opening, and braces extending between said plates.

15. A fuselage provided with a plurality of operator's openings, inclined strengthening plates lining the interior of the fuselage and disposed forwardly of each opening, and braces extending between said plates.

16. A fuselage having transverse strengthening plates lining the interior thereof, securing plates for tension members disposed upon the exterior thereof adjacent said first mentioned plates, and means for clamping said plates together.

In testimony that I claim the foregoing I have hereunto set my hand.

ARCHIBALD BLACK.